(12) United States Patent
Freeze

(10) Patent No.: US 10,133,154 B1
(45) Date of Patent: Nov. 20, 2018

(54) MOTORIZED SECURITY DOOR FOR ELECTRONIC COMMUNICATION DEVICES

(71) Applicant: Andrew J. Freeze, Butler, PA (US)

(72) Inventor: Andrew J. Freeze, Butler, PA (US)

( * ) Notice: Subject to any disclaimer, the term of this patent is extended or adjusted under 35 U.S.C. 154(b) by 0 days.

(21) Appl. No.: 15/823,347

(22) Filed: Nov. 27, 2017

Related U.S. Application Data

(63) Continuation-in-part of application No. 14/708,722, filed on May 11, 2015, now Pat. No. 9,854,142.

(51) Int. Cl.
*H04N 7/18* (2006.01)
*G03B 11/04* (2006.01)
*H04N 5/225* (2006.01)
*H02K 37/24* (2006.01)

(52) U.S. Cl.
CPC ......... *G03B 11/048* (2013.01); *H04N 5/2252* (2013.01); *H02K 37/24* (2013.01)

(58) Field of Classification Search
CPC .............................. H04N 5/2252; H04N 7/18
USPC .................................................. 348/142–159
See application file for complete search history.

(56) References Cited

U.S. PATENT DOCUMENTS 4,524,384 A * 6/1985 Lefkowitz .............. G08B 13/00
348/156

* cited by examiner

*Primary Examiner* — Anand S Rao
(74) *Attorney, Agent, or Firm* — Karen Tang-Wai Sutton

(57) ABSTRACT

A motorized shutter for a host communication device configured as a single or multipart shutter positioned over a lens of a host camera. The shutter is opened and closed by a stepper motor rotating a threaded screw coupled to a threaded nut to which the shutter is affixed in a clockwise or counterclockwise direction in one embodiment, or by the stepper motor rotating a series of gears including a bipartite rack and pinion, and spur gear configurations, with the shutter affixed to the bipartite rack in which movement of the rack by the gears moves the shutter so as to cover or uncover the lens. A separate logic board in communication with the stepper motor and with the host logic board receives and transmits instructions from the host logic board, allowing the host device to control the shutter independently of the camera operation.

20 Claims, 12 Drawing Sheets

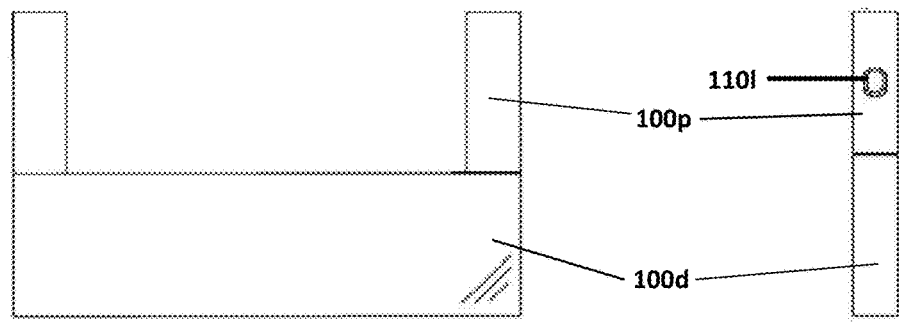
Fig. 1g                    Fig. 1h
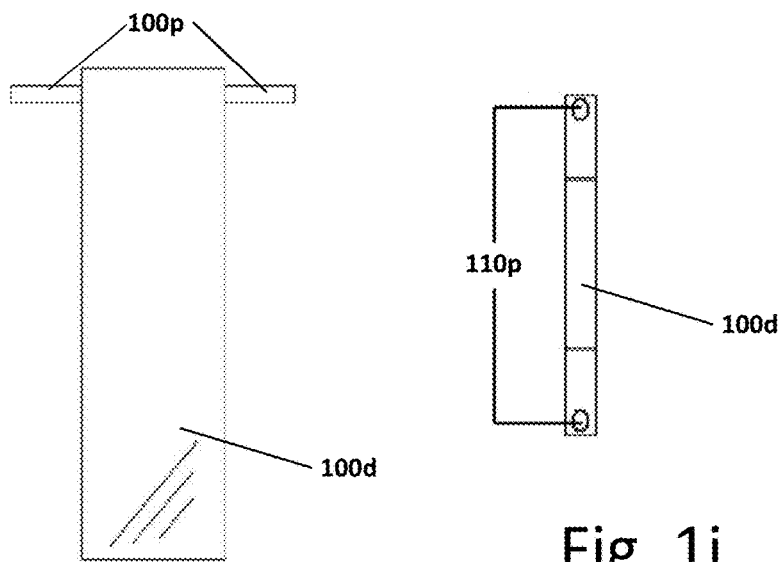
Fig. 1i                    Fig. 1j

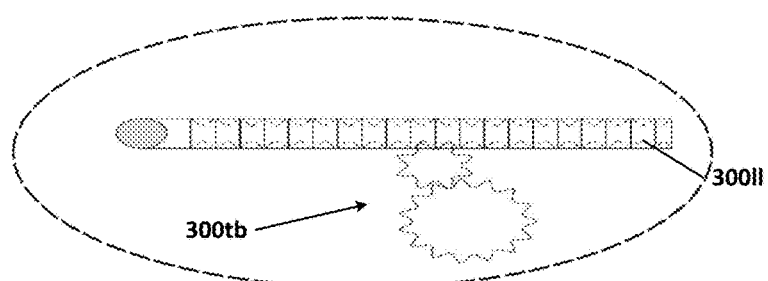
Fig. 3ff
Fig. 3fff
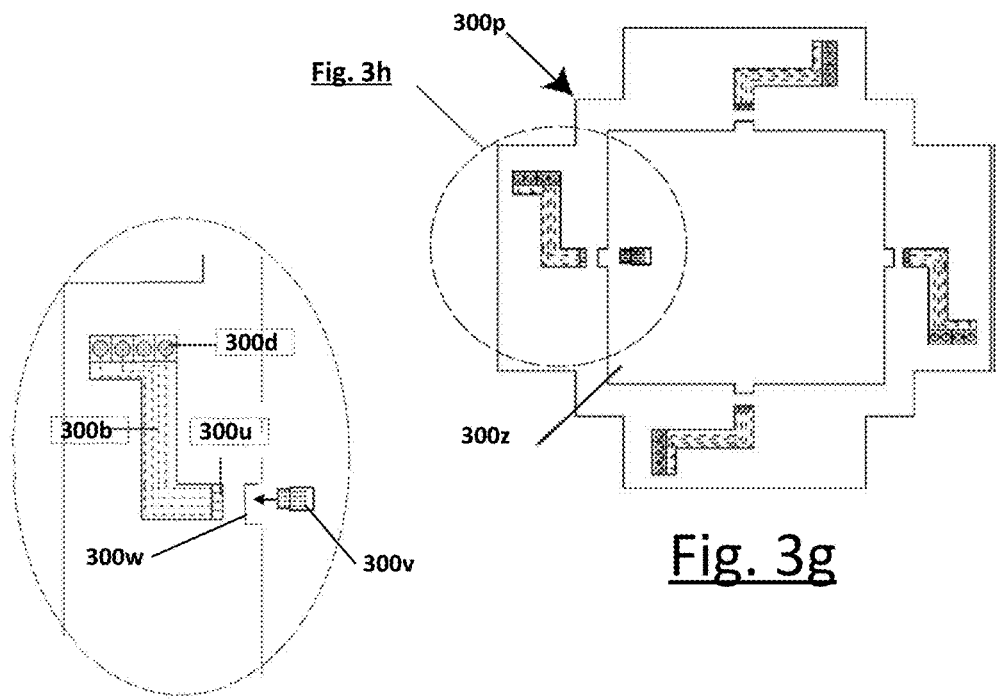
Fig. 3g
Fig. 3h

MOTORIZED SECURITY DOOR FOR ELECTRONIC COMMUNICATION DEVICES

CROSS REFERENCE TO RELATED APPLICATIONS

Reference is made to and priority claimed from U.S. application Ser. No. 14/708,722 filed 11 May 2015, which itself claims priority from U.S. provisional application Ser. No. 62/052,500 filed on 19 Sep. 2014.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION BY REFERENCE OF MATERIAL SUBMITTED ON A COMPACT DISC OR AS A TEXT FILE VIA THE EFS WEB SYSTEM

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention pertains to the field of securing data stored in a variety of electronic communication devices, such as smartphones, tablets, and laptop computers, from inadvertent or deliberate unauthorized access. More particularly, the present invention is a physical security door that can be closed over a camera lens of a camera integrated into the communication device 22 independent of the camera function.

Background Art

Most smartphones, tablets, laptop computers, MP3 players, and other electronic communication devices are visual communication devices, devices that have integrated cameras record and transmit visual data. The camera's lens is positioned either on the front face of the device, such as in the case with most laptop computers, where the camera lens is located along the monitor, facing the user, while in the case of tablets and smartphones, the camera lens is most often positioned so as to be rear-facing, with the camera lens aperture located along a back side of the device's shell or case. In all cases, the lens is either flush with the device's case or shell, or slightly recessed, but the camera's lens never has a physical cover.

In the prior art, a physical cover for a camera's lens is well known and its purpose is to protect the delicate lens from damage when the camera is not in use, such as scratches, which might otherwise result in poor quality photographs. The lens cover is removed only to allow pictures to be taken, and then replaced, the removing and replacing done either manually or automatically, to protect the lens while not in active use. In visual communication devices, however, the integrated camera and its lens are well protected by the design of the device, hence no physical cover is included or even deemed necessary because the lens area is generally impervious to damage, etc. during ordinary use of the communication device.

Unfortunately, electronic communication devices are controlled by software and their wireless connection to the world entices hackers and other miscreants to spy on the device user by remotely activating the device's own camera and transmit unauthorized video and pictures. A recent NSA scandal involving contractor Edward Snowden highlighted troubling information about a secret NSA program designed to hijack Apple's iPhone cameras, allowing the NSA to remotely activate the phone's camera and thus monitor the user. Coupled with the fact that many who use electronic communication devices sometimes don't realize their cameras are recording, for instance, by mistakenly thinking that a dark power saving screen on a smartphone means the camera is also off, the inclusion of an integrated camera has become a source of anxiety for many users. For instance, Symantec Corporation of Mountain View, Calif. sells a well-known security software Norton Security and Backup that allows users to remotely lock their devices so that in the event the device is lost or stolen, an unauthorized user cannot gain access to the data stored on the device. Further, the device, when turned on, will take pictures of the user, giving the real owner a snapshot of a potential thief or the location of the thief, but without the thief's knowledge that photos are being secretly taken. Companies who issue company-owned wireless communication devices often permanently disable the camera so as to avoid spying or mistaken transmission of sensitive information, even though they acknowledge the lack of the camera functionality is inconvenient.

What is needed is a physical security door for a visual communication device that can be conveniently opened or closed, automatically, as desired by a user, and whose position, either open or closed is independent of the functioning of the camera.

What is also needed is a physical security door for a visual communication device whose physical position can be easily and securely locked and yet also repositioned easily.

BRIEF SUMMARY OF THE INVENTION

Accordingly, in a first aspect of the invention, a motorized security door is provided for a visual communication device or host device having a host camera with a lens, a power supply, a host logic board in communication with both the host camera and host power supply, and host software installed in the host device controlling the host logic board. The motorized security door has at least one shutter with a door wing that is formed with a threaded nut coupling to a threaded screw that is itself rotatably coupled to a motor. The motor can turn the threaded screw in a clockwise or counterclockwise direction, according to instructions received by the motor. To open or close the motorized security door, the host software transmits directional and rotational information to the host logic board, which then communicates this information plus electrical power to a logic board of the motorized security door, which then transmits the data and electrical power to the motor. The motor turns the threaded screw according to directions it receives, and the motorized door opens or closes over the host camera lens, depending on the directional and rotational information received. Operation of the motorized security door is separate from operation of the host camera, and the host logic board solely controls the host camera function.

In a second aspect of the invention, the motorized security door according to the invention is further provided with a stepper motor to turn the threaded screw.

In yet a third aspect of the invention, at least one component of the motorized security door according to the invention is electrically connected to another component of the motorized security door or with a component of the host device.

In yet a fourth aspect of the invention, the motorized security door is powered by a battery of the host device.

In still yet a fifth aspect of the invention, the motorized security door is provided with a removable case that at least partially receives a housing of the host device and is removably affixed thereto by a clamp.

In still a sixth aspect of the invention, the motorized security door according to the invention is provided as a three layer stack, each layer having a front side and a back side, the front and back sides of each layer in physical and electrical communication with one another, and having a shutter assembly having at least one shutter fin opening and closing over the lens of the host camera. Each shutter fin is affixed to a pair of parallel, spaced-apart bipartite tracks, each bipartite track having a first track affixed to the first layer back side and to the at least one shutter fin, and a second track affixed to the second layer first side, the first track engaging the second track and wherein the second track is further formed with a series of teeth along each side of the second track. An inner gear set is positioned between the pair of bipartite tracks, each gear in the pair of gears engaging the other gear in the pair, and further engaging the series of teeth along an immediately adjacent side of each bipartite track in the pair of bipartite tracks. A drive gear is positioned so as to engage one gear of the inner gear set and is rotatably coupled to the motor. A pair of track receiving slots in spaced-apart relationship are sized, shaped, and positioned to receive the pair of bipartite tracks and positioned on at least one of the first layer and the second layer, such that when the motor rotates the drive gear in a clockwise or a counterclockwise direction according to instructions from host software from the host device transmitted to the host logic board and then to the logic board and finally to the motor, the pair of bipartite tracks either move into or out of the pair of track receiving slots, depending on the instructions received by the motor. When the bipartite tracks are received by the receiving slots, the shutter assembly is open and the lens of the host camera is exposed; when the bipartite tracks move out of the receiving slots, the lens of the host camera is covered.

In still a seventh aspect of the invention, the host camera operation is independent of the opening and closing of the shutter fin assembly, and only the host logic board transmits instructions to the host camera.

In yet an eighth aspect of the invention, the motorized security door is provided with a shutter fin assembly having two or more shutter fins, each shutter fin having a pair of bipartite tracks and receiving slots, and provided with an outer gear set wherein each gear from the outer gear set engages the other gear in the pair, and further engages the series of teeth along an immediately adjacent side of a bipartite track of the first pair and a bipartite track of the second pair.

BRIEF DESCRIPTION OF THE DRAWINGS

The features and advantages of the invention will become apparent from a consideration of the subsequent detailed description presented in connection with accompanying drawings, in which:

FIGS. 1a-j describe a first embodiment of a motorized security door according to the invention, configured as an external removable shell or case for a visual communication device or host device, typically a smartphone, in which:

FIG. 1a is an elevated back view of an exterior or outermost side of a shell or case of the first embodiment of the motorized security door, configured as a protective case adapted to be fitted over an existing back exterior shell of the host device, showing an upper and lower portion of the shell, and a camera shutter positioned on the upper portion of the shell.

FIG. 1b is an elevated back view of the upper portion of an interior of the shell or case in FIG. 1a, showing a rear camera shutter's opening and closing mechanisms and a plurality of female connecting receivers;

FIG. 1c is an elevated back view of the lower portion of an interior of the shell in FIG. 1a, showing a logic board and a plurality of male connecting pins adapted to couple with the female connecting receivers shown in FIG. 1b, as well as a serial USB connection which couples to a USB connection of the visual communication device and allows the motorized security door of the invention to communicate with the host device.

FIG. 1d is an elevated front view of an exterior front of the motorized security door shown in FIG. 1a, showing a front camera shutter covering a front camera aperture positioned at a front upper portion of the shell of the host device.

FIG. 1e is an internal front view of the motorized security door in FIG. 1d, showing the front shutter's opening and closing mechanism in the upper portion of the shell, and a male USB connection that couples to the USB port of the host device (not shown)

FIG. 1f is a side elevation view of the motorized security door shown in FIGS. 1a-1e.

FIGS. 1g-j are front and side views of the front camera and back camera shutters, where FIGS. 1g-h are views of the front shutter and FIGS. 1i-j are views of the back shutter.

FIGS. 2a-e describe a second embodiment of a motorized security door according to the invention, as configured as an external case or shell adapted to be affixed to a visual communication device or host device, such as a smartphone, tablet, laptop computer, smart television, etc., and removably secured to the visual communication device via a clamping mechanism, in which:

FIG. 2a is a side elevation view of the second embodiment of the motorized security door according to the invention.

FIG. 2b is a front external view of the motorized security door in FIG. 2a.

FIG. 2c is a front internal view of the motorized security door in FIG. 2b, showing a mechanism for opening and closing a front shutter.

FIG. 2d is a back internal view of the motorized security door in FIG. 2a, showing screws in the case for removably affixing the invention to the host device, and showing a flex ribbon in communication with a female USB port.

FIGS. 2e and 2f are front and top views, respectively, of the front shutter in FIG. 2c.

FIGS. 3a-o describe a third embodiment of a motorized security door according to the invention, configured as a motorized shutter fully integrated into a visual communication device or host device, and shown from a viewpoint in which a front view is how the motorized security door would appear as installed over a camera lens of the host device, in which:

FIG. 3a front external view of the third embodiment of the motorized security door according to the invention, shown with a plurality of assembled shutter fins in a closed position, covering a front camera of the host device or host camera.

FIG. 3ff is a front view of a lower track showing the hill and valley profile of a front of the track, and a hill and valley profile formed along a side of the track that serves as a rack meshing with corresponding hill and valley or teeth of a corresponding pinion gear, where higher points or hills depicted as darker lines, and lower points or valleys depicted as lighter lines.

FIG. 3fff is a side view of the lower track in FIG. 3ff showing the hill and valley profile of the front of the track, and the hill and valley profile of the side where hills are shown with a darker line and valleys shown with a lighter line.

FIG. 3g is a back view of Layer B in FIGS. 3b and 3e.
FIG. 3hh is a side view of a male clip joining a female to male ribbon connection

FIG. 3o is a side view of the single shutter fin in FIG. 3n, as viewed along plane A-B, and noting point B corresponds to a corner of the assembled shutter where two shutter fins meet and together form a 90 degree angle; and point A corresponds to a position where two shutter fins meet and together form a 180 degree line, point A having a notched edge, and point B having a pointed tip.

DRAWINGS LIST OF REFERENCE NUMERALS

Figure 1A:
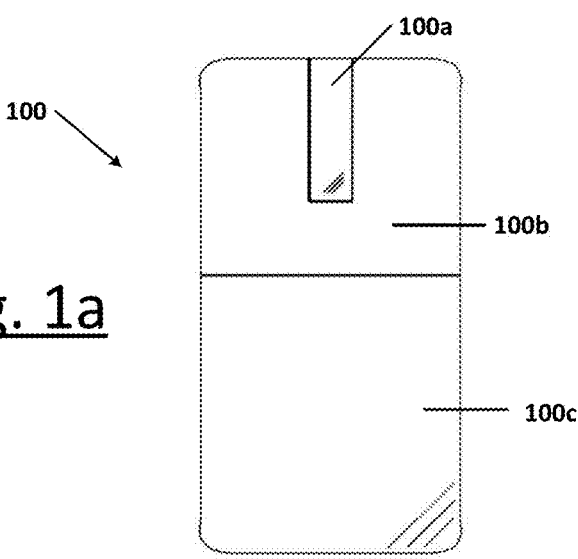

The following is a list of reference labels used in the drawings to label components of different embodiments of the invention, and the names of the indicated components:

First Embodiment: FIGS. 1a-j 100 motorized security door
100a rear (camera) shutter
100b upper portion of shell or case
100c lower portion of shell or case
100d front (camera) shutter
100e logic board
100f serial USB connection
100g flex ribbon to drive front motor
100h flex ribbon to drive rear motors (in parallel)
100i male connecting pins to relay signal to upper portion of shell or case
100j female connecting receivers to receive signals from male connecting pins or pins
100k rear stepper motors to drive rear shutter
100l threaded screw
100m threaded nuts for coupling with threaded screw
100n male USB connector
100o front stepper motor to drive front shutter
100p door wing (attaches door to threaded screw)
100q threaded hole or threaded nut formed in door wing Second Embodiment: FIGS. 2a-f 200 motorized security door second embodiment
200a external case or shell
200b female USB port
200c front shutter
200d threaded screws for shutter movement
200e stepper motors
200f logic board
200g flex ribbon for USB connection
200h flex ribbon for stepper motors
200i shutter screws to tighten case on host device
200j threaded nut molded into door wing
200p door wings Third Embodiment: FIGS. 3a-o 300 motorized security door third embodiment
300a case
300aa outermost front of case
300ab outermost back of case
300af innermost back of case
300b flex ribbon for power and communication for the motorized security door
300bb back of case
300c flex ribbon for power and communication for the camera
300d male connection pins
300e female connection pins
300f slot or hole into which camera flex ribbon inserts
300g layer alignment blocks
300h shutter fin assembly
300i (single) shutter fin
300j external side of case
300l upper track for Layer A back
300ll lower track for Layer B front
300m receiving slots for tracks 300l and 300ll
300n pins to attach tracks to individual shutter fins 300i
300nn through-holes (receiving pins 300n)
300o First Layer or Layer A
300of Layer A front
300ob Layer A back
300p Second Layer or Layer B
300pf Layer B front
300pb Layer B back
300q female to female connection
300r stepper motor
300s logic board (receives communication from host device)

300*t* gear configuration for moving locked tracks 300*l* to open or close shutter fin 300*i*
300*tb* outer track gear set
300*tc* inner track gear set
300*tr* drive gear attached to stepper motor
300*u* female to male flex ribbon connection
300*v* male ribbon clips
300*w* clip insertion area
300*x* Third Layer or Layer C
300*xf* Layer C front
300*xb* Layer C back
300*y* main power and communication ribbon for host device to connect to motorized security door
300*z* space for host camera

GLOSSARY OF TERMS AND EXPLANATION OF DRAWINGS

Aperture: a cutout in the housing or shell or case of a communication device or of the invention that allows the lens of a camera of a host device access to visual data existing outside of the communication device shell. The aperture is covered by a transparent covering protecting the lens, and use of aperture is meant generally to indicate a space for the camera lens.

Communication device or Visual communication device or host device: an electronic device, including cellphones, tablets, laptop computers, MP3 players, etc., having an integrated camera with an ability to capture and store or transmit visual data, and includes communication devices that are mobile and wireless, such as smartphones, and also those that are generally fixed or stationary, such as security devices with cameras that are mounted to a wall or ceiling, cameras built into appliance and common household items such as tvs and refrigerators, and to cameras in general that capture and transmit visual data, whether by wire or wirelessly, to another location.

Motorized security door or motorized door or security door: Includes all parts necessary for the operation of a shutter for a communication device as described herein, and is used to generally describe the invention as being configured as an external, removable case for a communication device as well an integral security shutter housed inside a communication device.

Shell or case: an exterior housing, in a first and second embodiments describing a removable protective case and in a third embodiment where the motorized security door is integrated into the host device as a non easily removable unit installed inside the host device itself.

Dashed lines in drawings: denotes electrical connection; flexible communication ribbon supplying power and relaying signals.

Dash Dot Dash lines in drawings: denotes hidden lines showing features not normally visible in the drawing view, such as holes.

DETAILED DESCRIPTION OF THE INVENTION

A motorized security door 100 200 300, is shown in the Figures in three embodiments: a first embodiment in FIGS. 1*a-j*, configured as a removable external case that fits snugly onto an outermost or exterior shell of a host device such as a smartphone, a second embodiment in FIGS. 2*a-f*, configured as a removable external case configured for a host device such as a laptop or smart television, and a third embodiment in FIGS. 3*a-m*, configured as an Integrated door built into the host device itself. All three embodiments share the following characteristics: all feature a motorized shutter that opens and closes over a camera lens of a host device camera or host camera, the motorized shutter adapted to be automatically opened or closed by software installed on the host device communicating with at least one motor coupled to at least one shutter per host device, and importantly, operation of the shutter is independent of camera operation. The inventor notes that in the prior art, motorized camera shutters automatically open and close based on camera operation; the camera shutter opens when the camera is being used and closes only when the camera is inactive. The inventor believes there are times when it is more convenient to leave the camera function running but optimal to close the camera shutter and prevent the camera from recording images, even with an automatic door opening/closing system. Such would be the case when a series of pictures are to be taken, and time is needed between camera shots to arrange the image. For a traditional film camera, the camera does nothing between shots, but for a digital camera, the camera continues to image everything, and it is conceivable that the images received through the lens are being surreptitiously recorded. Digital cameras, while improving, still respond more slowly when activated or inactivated as compared to traditional film cameras, and thus turning the camera on and off between shots to avoid unwanted photographs or recordings is generally too time-consuming and cumbersome when a series of shots are to be taken with a relatively short time lapse between shots. Turning off a digital camera between desired shots results in missed shots, so current camera users typically are forced to leave their cameras operational even between shots.

Figure 1B:
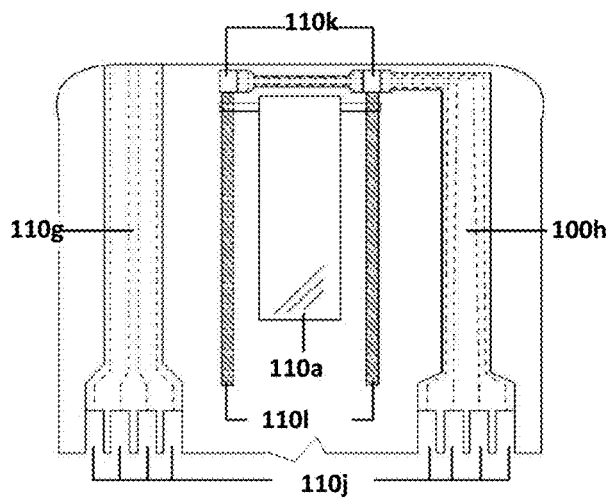
Figure 1C:
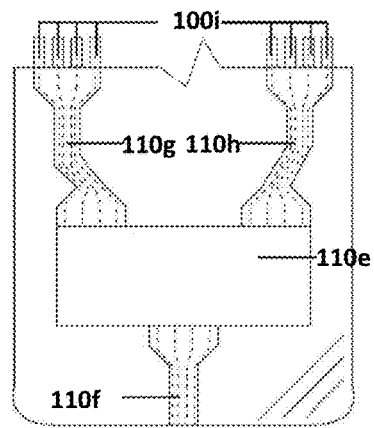
Figure 1D:
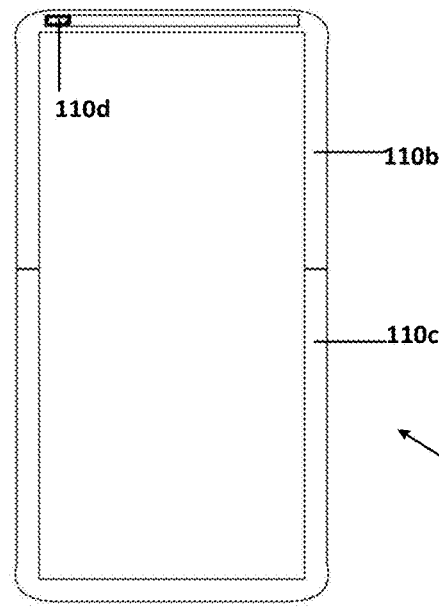
Figure 1F:
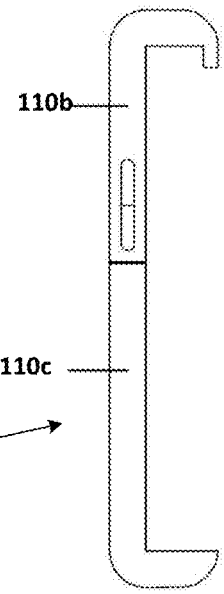

Turning now to FIGS. 1*a-j*, the first embodiment of the motorized security door 100 is configured as a removable protective shell or case having an upper portion 100*b* and a lower portion 100*c*, and visible from an exterior or outermost side of the case, a rear camera shutter 100*a* positioned in FIG. 1*a* in the upper portion 100*b* of the shell on a back side of the case, and a front camera shutter 100*d* positioned in FIG. 1*d* also in the upper portion 100*b* of the shell on a front side of the case. The inventor notes that the rear and front camera shutters 100*a* 100*d* are shown generally in the upper portion of the case, although the exact location on the case depends on the location of the host camera in the host device, and thus host camera location varies between device manufacturers for a variety of reasons. The inventor stresses that the positions of the motorized security door 100 shown in the Figures are illustrative only of some common locations for the host camera, but the exact location will depend largely on the characteristics of the host device itself.

Turning now to FIGS. 1*b-c*, on an innermost side or interior of the case, the rear camera shutter 100*a* is typically configured as a single shutter, shown here as being generally square or rectangular in shape, and fitted with a pair of door wings 100*p* on opposed sides of the shutter along an uppermost edge of the rear camera shutter 100*a*. The door wings 100*p* are shown in greater detail in FIGS. 1*i-j*, and can be formed as a single piece along with the rear shutter 100*a*, or as separate pieces fixed to the shutter 100*a*. Each door wing 100*p* is threadably coupled to a threaded screw 100*l* via a threaded nut or hole 100*q* formed into each door wing 100*p*.

The inventor notes that two door wings 100*p* and two threaded screws 100*l* are shown affixed to the rear camera shutter 100*a*, however it is also possible that a single door wing with a single threaded screw are capable of moving the rear camera shutter 100*a* back and forth over the lens of the host camera. As the threaded screws 100*l* turn, the threaded nuts 100*q* allow the rear camera shutter 100*a* to travel along a length of the threaded screw 100*l*, whose length is determined by the size of the lens of the host camera and the necessary clearance needed for the rear camera shutter to completely expose or cover the lens of the host camera.

Figure 1E:
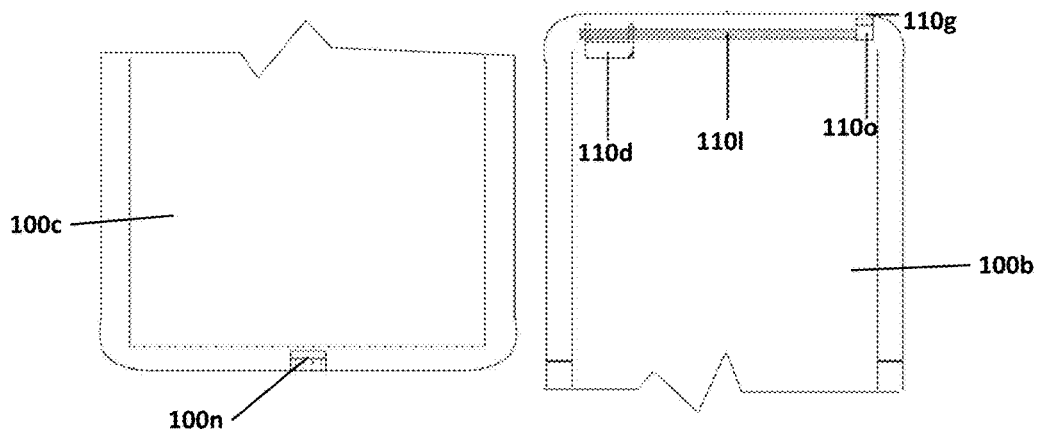

Turning now to FIGS. 1*d-e*, for the front camera shutter 100*d* where a front host camera is typically positioned along an uppermost edge of a front face of the host device, the front shutter 100*d* is threadably suspended on a single threaded screw 100*l* by a pair of door wings 100*p* in spaced-apart relationship, with each wing formed with a threaded nut 100*q* sized and shaped to receive the threaded screw 100*l*, but as mentioned previously, the front camera shutter 100*d* could also be configured with a single door wing 100*p* threadably coupling the front camera shutter 100*d* to the threaded screw 100*l*.

The inventor emphasizes that the threaded screw 100*l* coupled to the threaded nut 100*q* are important positional locking features of the motorized security door 100 because the coupled threads maintain shutter 100*a* 100*d* position along the length of the threaded screw 100*l* and thus enable the shutter's position to be locked in place and yet easily repositioned as desired. The threaded coupling of nut and screw is an improvement over designs where the security door's position is simply held in place by frictional forces, such as the door travelling inside a rail or rails and the door and rail feature mating structures, for instance the door having one or more raised surfaces that fit into corresponding recesses formed into the rail or rails to secure the door position, as is the case with the inventor's previous invention described in U.S. application Ser. No. 14/708,722.

For the rear camera shutter 100*a*, an uppermost end of each threaded screw 100*l* is rotatably coupled to an individual rear stepper motor 100*k*, and in FIG. 1*b*, a pair of rear stepper motors 100*k* are used, one per threaded screw 100*l*. The threaded screw 100*l* for the front camera shutter 100*d* is positioned along a top edge of the upper portion 100*b* of the case, and one end of the threaded screw 100*l* is rotatably coupled to a front stepper motor 100*o*. The rear stepper motors 100*k* are in communication with one another, so as to be controlled and powered simultaneously. All stepper motors 100*k* 100*o* are connected to a logic board 100*e* of the motorized security door 100 by a pair of flex ribbons 100*h* 100*g*, the rear stepper motors 100*k* connected to the logic board 100*e* via a pair of flex ribbons 100*h*, and the front stepper motor 100*o* by a second set of flex ribbons 100*g*, the flex ribbon 100*h* 100*o* located in the upper portion of the case and terminating in a series of female connecting receivers 100*j* coupled to male connecting pins 100*i* of the flex ribbon 100*h* 100*o* located in the lower portion of the case and directly communicating with the logic board 100*e* that is also generally positioned in the lower portion of the case. The flex ribbons 100*h* 100*g* transmit power and signals from the logic board 100*e* to the stepper motors 100*k* 100*o*. Flex ribbon is also known as flexible flat cable, and features multiple metallic conductors bonded to one surface that are commonly used in electronics.

A male USB connection 100*n* is connected to a serial USB connector 100*f* that is in turn connected to the logic board 100*e*. When the case is installed on the host device, the male USB connection 100*n* couples to a corresponding USB port of the host device, allowing power and communication data from the host device to be transmitted to the logic board 100*e* of the motorized security door 100. Software (not shown) installed on the host device is then used to control the rear and front camera shutters 100*a* 100*d*, allowing the shutters to be opened or closed, as directed, by actuating and controlling the direction of rotation of the threaded screws 100*l* by the respective stepper motors 100*k* 100*o*. It should be noted that front and back camera shutters can also be operated independently of one another as well as independently of camera operation.

While the first embodiment shown in FIGS. 1*a-e* relies on the host device for power, the inventor notes that a separate power supply, or a supplemental power supply such as a battery (not shown) may also be incorporated into the interior of the case to supplement or alternatively power the rear and front camera shutters to avoid draining the host device's battery. The inventor has not shown an external battery housed inside the case, as current battery technology would tend to make the case bulkier and thus less desirable, although the inventor is aware such drawbacks likely will be mitigated in the future as battery technology continues to refine and miniaturize batteries. The inventor believes that one day a separate lightweight, slim profile, rechargeable and powerful battery could be included to power the motorized security door 100 and not drain the host device's internal (battery) power supply, while retaining the male USB connector 100*n* to allow the host device to most conveniently communicate with the stepper motors 100*k* 100*o* to open and close the shutters 100*a* 100*d*.

All components of the first embodiment of the motorized security door 100 described above are housed inside the case, sandwiched between the front case and back case so as not to be visible or damaged when the removable case is positioned onto or removed from the host device, and is designed to look and feel like a traditional prior art protective case with the exception of the presence of the male USB connector 100*n* that couples to the host device's corresponding USB port when the case is installed on the host device.

Figure 2A:
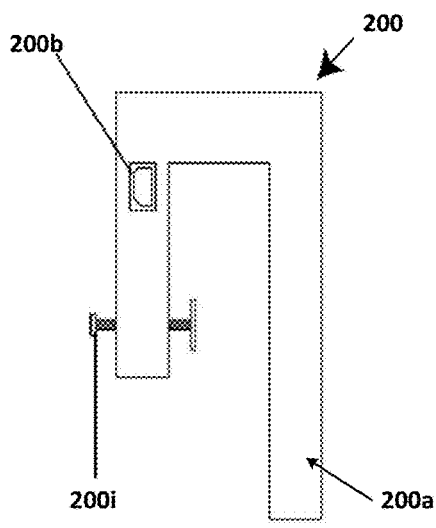
Figure 2D:
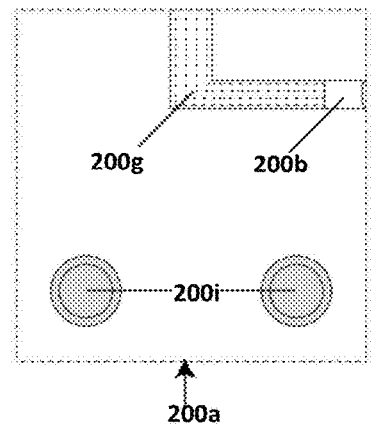
Figure 3A:
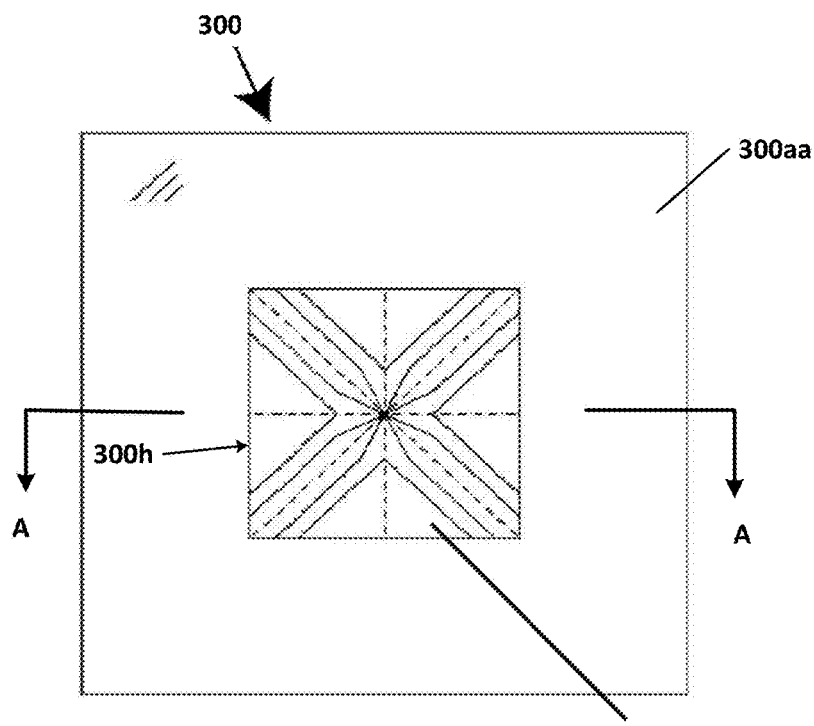

Turning now to FIGS. 2*a-ef*, in the second embodiment, the motorized security door 200 is configured is as a removable case 200*a* for a visual communication device or host device, such as a laptop, tablet or smart television where the host device has a single front facing camera and the case 200*a* of the motorized security door 200 is not designed to fit around or otherwise enclose an entire side of an outer shell of the host device. The case 200*a* is removably affixed to a portion of the host device by clamping the case, tightening at least one shutter screw 200*i* of the case 200*a*, and for a larger host device, such as a smart tv, typically by clamping the case 200*a* by tightening a pair of shutter screws 200*i* as shown in FIG. 2*d*. A female USB port 200*b* is positioned on a side of the case 200*a* with the open port end accessible from an exterior of the case 200*a*, and via a USB cable (not shown) mating with the female USB port and a port of the host device, the host device connects to the motorized security door 200 and transmits power and communication signals from the host device to the motorized security door 200. The case 200*a* typically does not cover an entire back side of the host device but rather clamps to an upper portion of the host device where a host camera is typically positioned.

Figure 2B:
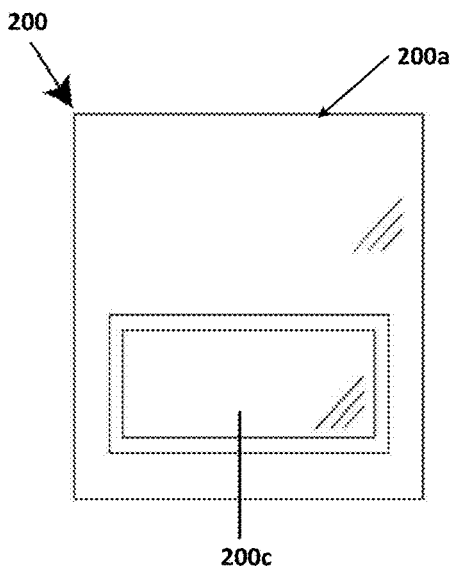
Figure 2C:
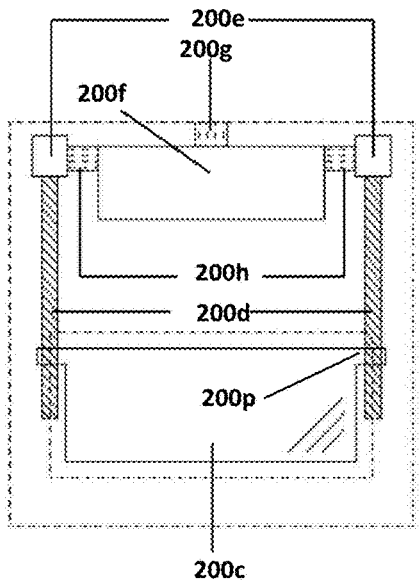
Figure 2E:
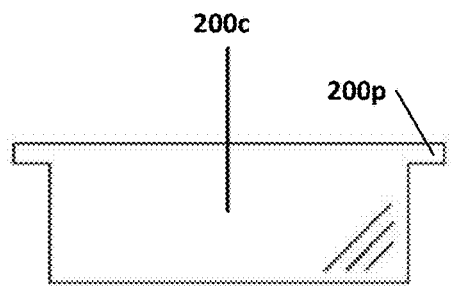
Figure 2F:
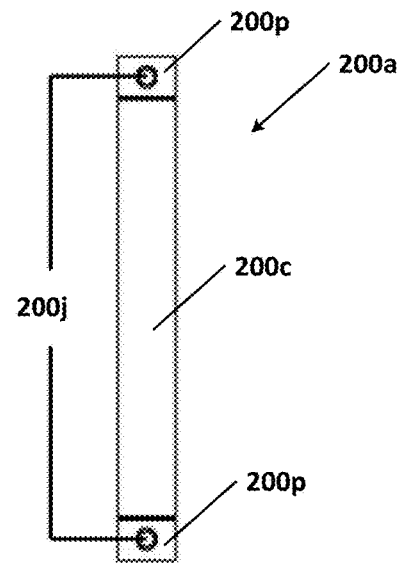

Turning now to FIG. 2*a*, a side view of the case 200*a* is shown, with a front face of the case, shown in FIG. 2*b*, on a right side of the drawing in FIG. 2*a*, such that the shutter screw 200*i* is tightened against the back side of the host device. A front shutter 200*c*, shown in FIGS. 2*c*, and 2*e-f*, is shown as having a pair of door wings 200*p* formed or attached to an uppermost portion of the front camera shutter 200*c*, and as in the rear camera shutter 100*a* in the first embodiment, each door wing 200*p* is formed with a threaded nut or hole 200*j* sized and shaped to threadably couple to a threaded screw 200d. The Figures show the front camera shutter 200c positioned between two parallel threaded screws 200d coupled to the front camera shutter 200c via the threaded nuts 200j, where the threaded screws are parallel to the sides of the case 200a, but the inventor stresses that a single door wing 200p with a single threaded nut 200j coupled to a single threaded screw 200d located either to a right or to a left of the host camera can sufficiently move the front camera shutter 200c along a length of the threaded screw 200d that is sufficiently long to allow the front camera shutter to completely uncover or cover the lens of the host camera. An uppermost end of each threaded screw 200d is rotatably coupled to a (front) stepper motor 200e, and for the embodiment shown in the FIG. 2c, two stepper motors are required, one per threaded screw 200d. The stepper motors 200e are connected to a logic board 200f of the motorized security door 200 by flex ribbons 200h. The logic board 200f via a flex ribbon 200g is connected to the female USB port 200b. When the host device is connected to the female USB port 200b, software installed on the host device transmits power and communication data through the female USB port 200b to the stepper motors 200e via the flex ribbons 200g 200h and the logic board 200f, powering and directing the stepper motors 200e to rotate the threaded screws according to rotational and directional instructions transmitted from the host device to the stepper motors via the logic board 200f, thus allowing the front camera shutter 200c to be opened or closed by travelling along a length of the threaded screws 200d. Shutter position is again maintained by the threaded nut 200j formed into the door wing 200p coupled to the threaded screw 200d, prevents slippage but still allowing the shutter to be repositioned easily upon instruction from the host device via the motorized security door's logic board 200f.

As previously noted, while not shown in the Figures as the second embodiment relies on the power supply of the host device, the inventor affirms that a battery or even an external plug in power supply can be used to separately power the motorized security door 200 as it is common for add-on devices such as the present invention to be separately powered.

Turning now to FIGS. 3a-o, in the third embodiment, the motorized security door 300 is a fully enclosed assembly with its own housing or case 300a, and installed inside a visual communication device or host device, for instance, a smartphone, or a security camera adapted to be mounted to a wall, where the motorized security door 300 is positioned with the host camera mounted inside the case 300a such that a shutter fin assembly 300h is positioned directly above the lens of the host camera but below an outermost cover of the host device, which in a typical application is an optically clear lens protective cover commonly installed over a smartphone camera lens in the prior art. The host camera fitted inside the case of the motorized security door 300 is secured to one layer in an internal three layer stack, but the host camera powered and controlled directly by a logic board of the host device or host logic board (not shown). Thus, the motorized security door 300 and the host device (not shown) have separate logic boards in this embodiment, although the inventor believes his invention can share the host logic board with some necessary reconfiguration of the structures such as flex ribbons described herein. The inventor also notes that with improvements in communications technology, flex ribbon or other electrical connections between components may be eliminated and replaced instead with wireless connections between certain components, for instance, between the host logic board and the logic board of the motorized security door.

Figure 3B:
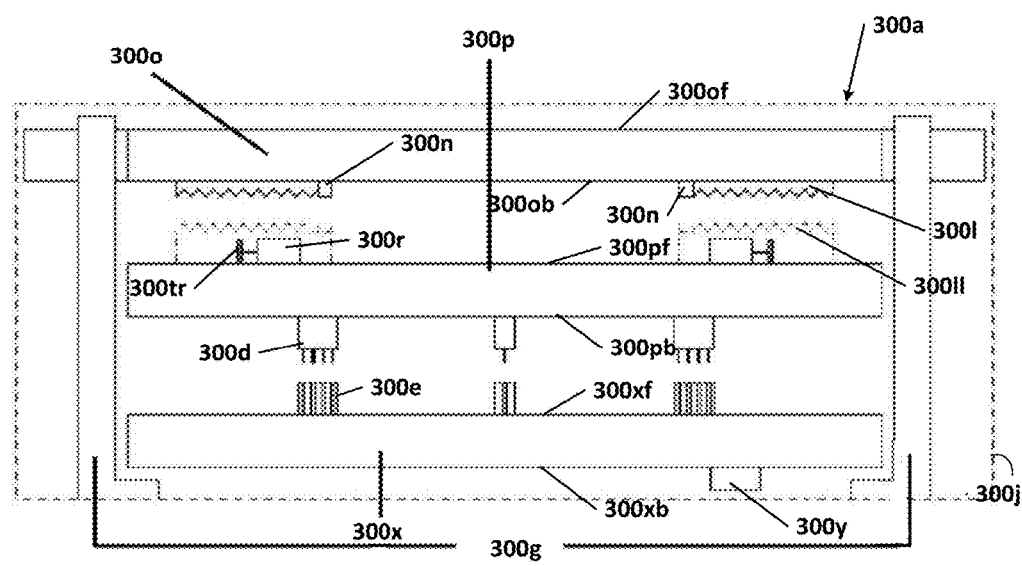
FIG. 3b is a cross-sectional, partial exploded view of the third embodiment of the motorized security door shown in FIG. 3a, cut along lines A-A, showing an arrangement of a stack of three internal layers A, B, C, shown in partial exploded view, where Layer A is directly behind a shutter fin assembly, and a where a host camera (not shown for increased understanding of the layers) is secured to a Layer C. Layers A, B, and C are also shown having front and back faces labelled accordingly.

Turning now to FIG. 3a, a front view of the motorized security door and to FIG. 3b, a cross sectional partially exploded view of motorized security door in FIG. 3a, taken along lines A-A, shows the motorized security door 300 having the exterior housing or case 300a with a centralized aperture formed in the front of case 300aa through which the shutter fin assembly 300h of the motorized security door 300 is exposed. In FIG. 3b, between the front of case 300aa and an outermost back of case 300ab, the motorized security door 300 is shown as having three layers, a Layer A 300o, a Layer B 300p, and a Layer C 300x stacked, aligned, and secured on top of one another, with the Layer A 300o directly adjacent the front of case 300aa, and the Layer C 300x directly adjacent an innermost back of case 300af. Each Layer 300o 300p 300x in turn has a front and a back, positional relationships of the respective front and back sides of the layers shown most clearly in FIG. 3b.

Figure 3C:
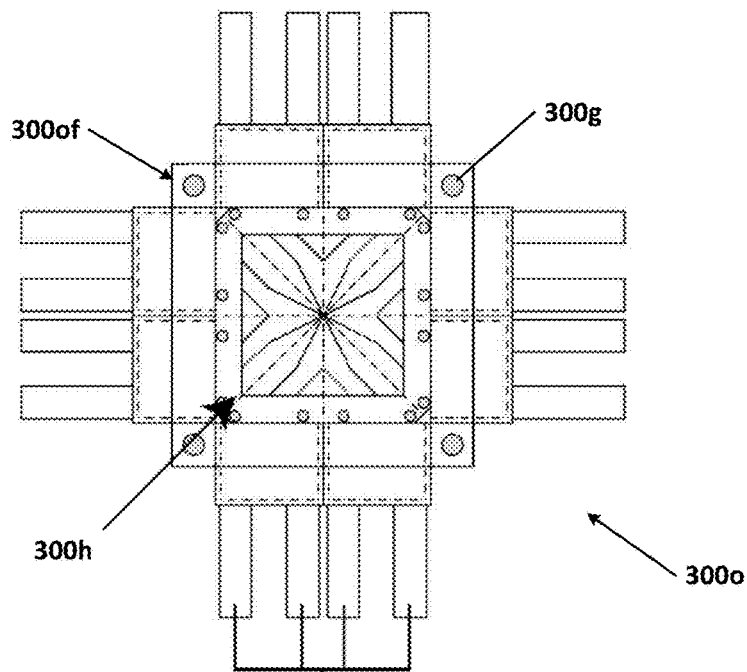
FIG. 3c is a front view of Layer A in FIG. 3b.
Figure 3D:
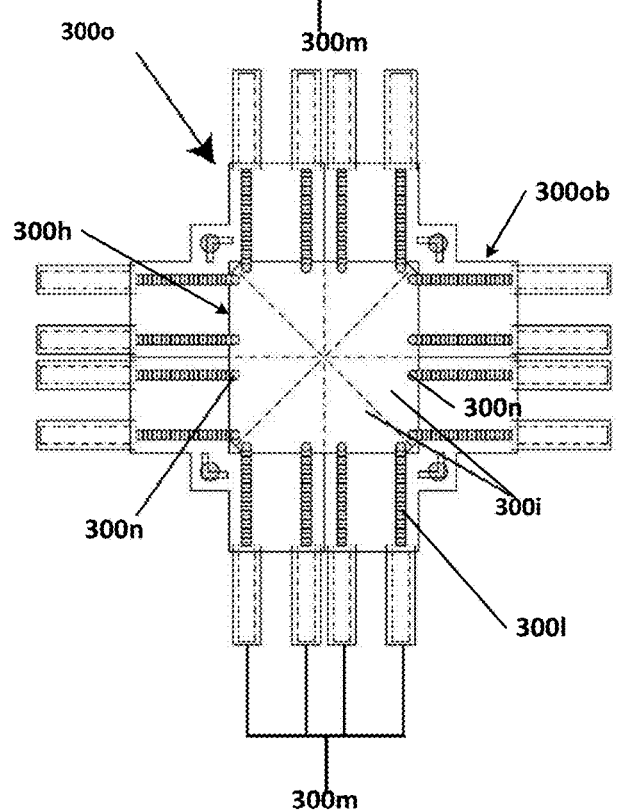
FIG. 3d is a back view of Layer A in FIGS. 3b-c

The Layer A 300o is shown in detail in FIGS. 3c-d. The Layer A 300o has a Layer A front 300of, shown in FIG. 3c, in which the shutter fin assembly 300h is affixed, and viewable through the aperture formed in the front of case 300aa. The shutter fin assembly 300h is in turn comprised of a plurality of individual shutter fins 300i, and in FIG. 3m, the shutter fin assembly 300h is shown as comprised of eight individual shutter fins 300i, although the inventor stresses that the number of individual shutter fins needed for the shutter fin assembly can vary depending on design needs based on the host device, and this embodiment is a representative number of shutter fins 300i used to make the shutter fin assembly 300h for a typical smartphone. Each individual shutter fin 300i is generally triangular in shape, approximating a right angle triangle, as is most clearly shown in FIG. 3n, and formed with a pair of opposed through-holes 300nn sized and shaped to receive a pin 300n, the through-holes 300nn and positioned near points A and B. Looking now at FIG. 3o, a side view of the shutter fin in FIG. 3n as viewed along a side having points A and B, at point A, the shutter fin terminates in a notch and at point B, the shutter fin terminates in a vertex. At point A, where two individual shutter fins meet, an adjacent shutter fin is a mirror image of its immediately adjacent shutter fin. Hence, at point A, the notch shown in the immediately adjacent shutter fin is a mirror image (reverse) of the notch in its immediately adjacent neighbor shutter fin, allowing the notches to mate. At point B, the vertex of the shutter fin 300i and a vertex of the adjacent shutter fin are positioned side by side when all the shutter fins 300i of the shutter fin assembly 300h are in a closed position in the aperture of the case 300aa. Point C of each shutter fin 300i in the shutter fin assembly 300h is positioned in a center of the closed shutter fin assembly 300h. Each shutter fin is a mirror image of its immediately adjacent shutter fin neighbor, as clearly shown in FIG. 3m.

The pins 300n inserted into each through-hole 300nn in each shutter fin 300i secure each shutter fin 300i to a pair of upper tracks 300l, found on a Layer A back 300ob, shown in FIG. 3d. Each upper track 300l shown in the Figures are formed with alternating hills and valleys that mate with a corresponding set of hills and valleys in a lower track 300ll positioned on a Layer B front 300pf, and mating of upper and lower tracks forms an engaged bipartite track that moves as a single track unit. The teeth and base of the teeth or hills and valleys of the tracks 300l 300ll are depicted in the Figures using darker lines to designate a top of each hill and a less distinct line to designate a lowermost point or valley between each hill. The inventor notes that for the upper and lower track engagement, instead of meshing teeth, any suitable interlocking design can be used so long as the upper and lower tracks are secured and the interlocking design does not interfere with the movement of the track. Each shutter fin 300*i* is secured to the pair of parallel upper tracks 300*l* via the pins 300*n*, and when upper and lower tracks are engaged, the resulting engaged track is sized and shaped to insert into and be remove from a pair of receiving slots 300*m* formed into the Layer A front 300*of* and back 300*ob*, although only accessible by the locked bipartite track from the Layer A back 300*ob*.

Figure 3E:
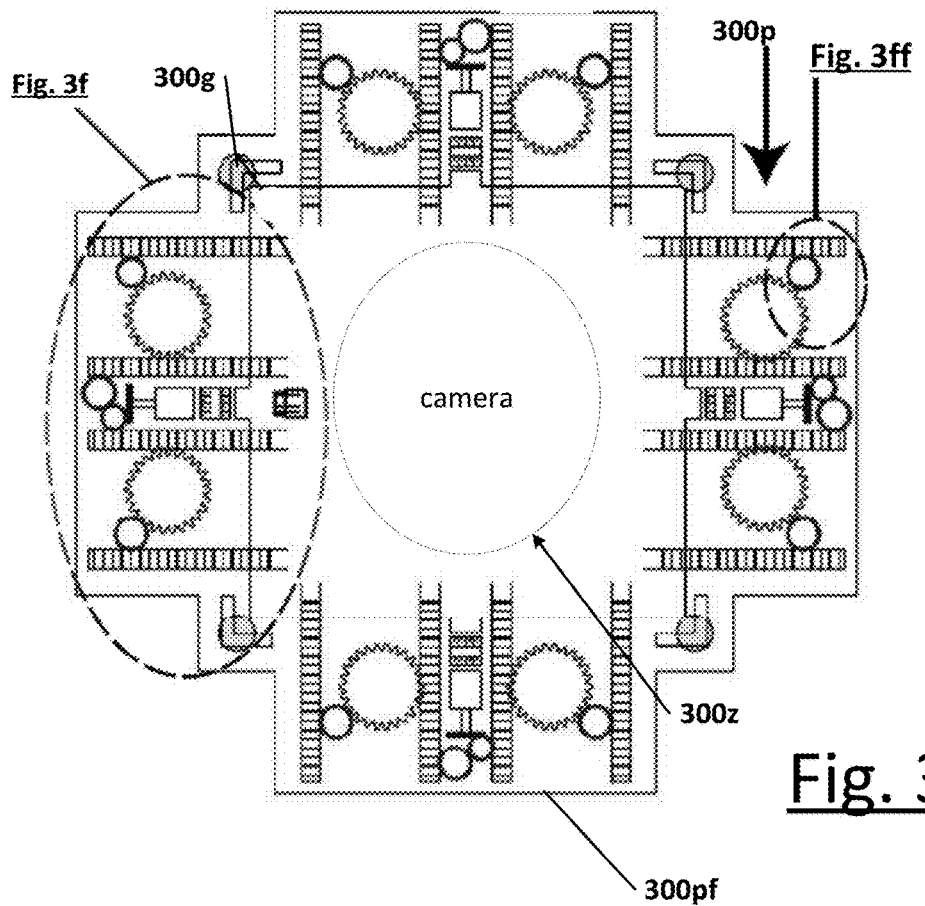
FIG. 3e is a front view of Layer B in FIG. 3b.
Figure 3F:
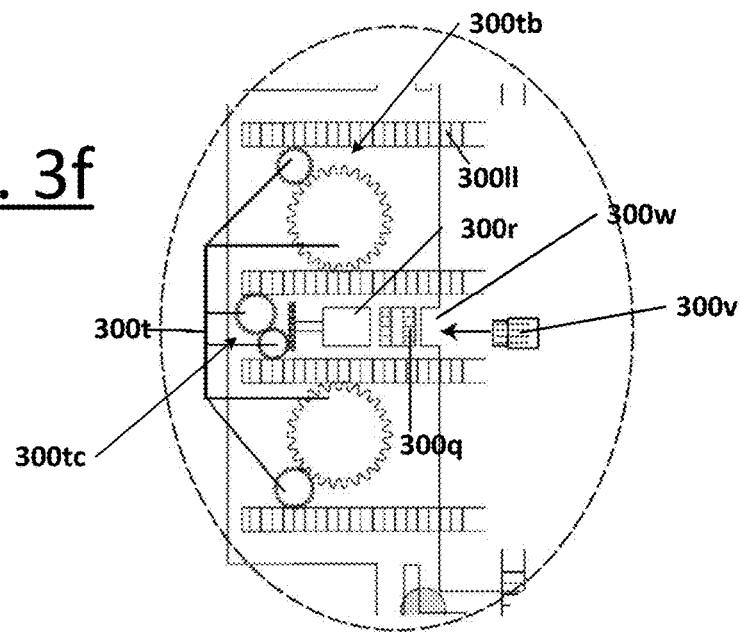
FIG. 3f is a detail view of a gear and track configuration from FIG. 3e, for positioning a single shutter fin in either an open or closed position.

The Layer B 300*p* is shown in greater detail in FIGS. 3*e-h*. The Layer B 300*p* has a Layer B front 300*pf* which lies directly adjacent the Layer A back 300*ob*, again as shown most clearly in FIG. 3*b*. FIG. 3*f* shows a detail view of a gear configuration 300*t* that moves each engaged track pair simultaneously in and out of the receiving slots 300*m*, resulting in the shutter fins 300*i* being in an open position when the engaged tracks are fully inserted into the receiving slots 300*m*, and in a closed position when the engaged tracks fully exit the receiving slots 300*m*.

Looking at FIG. 3*e*, a total of four gear configurations 300*t* are shown, and focusing on detail view FIG. 3*f*, each gear configuration is further comprised of three sets of gear sets, two outer gear sets 300*tb* and a single inner gear set 300*tc*. A stepper motor 300*r* positioned between the two pairs of engaged tracks 300*l* 300*ll* is coupled to a drive gear 300*tr* which engages one of the gears of the inner gear set 300*tc*. The inventor notes that while the Figures, the gear sets are generally shown configured as pairs of gears, the term "gear sets" includes "two or more" gears in a set, and hence the gear sets could be comprised of three gears, or combinations of two and three gears, depending on the physical space and other physical characteristics of the host device. The stepper motor 300*r* is responsible for opening and closing two immediately adjacent shutter fins 300*i* of the shutter fin assembly 300*h*. The lower track 300*ll* is further formed with a series of teeth along its sides perpendicular to the hill and valley design on the front face of the lower track 300*ll*, the teeth sized and shaped to mesh with teeth of one gear of the inner gear set 300*tc*, with the side teeth design of the lower track 300*ll* effectively a (gear) rack and the engaged gear of the inner gear set 300*tc* its pinion gear. Similarly, each gear of the outer gear set 300*tb* is a pinion gear that meshes with and engages the teeth formed into the adjacent side of the lower track 300*ll* in the pair of engaged tracks per individual shutter fin 300*i*, with the lower track's side teeth engaging one gear of the outer gear set on a same side of the shutter fin around point A (see FIG. 3*n-o* for point A position), and further simultaneously engaging one of the gears of the inner gear set 300*tc*. When the stepper motor 300*r* is actuated, it turns the drive gear 300*tr* that turns the inner gear set 300*tc*, simultaneously moving the engaged tracks immediately adjacent the inner gear set 300*tc* and the outer gear sets 300*tb*, causing all engaged tracks of two immediately adjacent shutter fins to move in or out of their respective receiving slots 300*m*, depending on the direction the stepper motor turns the drive gear 300*tr*. The inventor notes that using gears and racks, like the coupling of the threaded nut and screw in the previously described embodiments, allows the shutter fin position to be easily locked in place and yet easily moved because all motion is dependent on the motor turning gears and meshed teeth between engaged gears and between the rack and pinion systems ensure no slippage or unwanted movement of the shutter fins.

It should be noted that while in the Figures, the shutter fin assembly is shown affixed to the Layer A face, in another embodiment (not shown), the assembly can also be affixed directly to an innermost side of the front case, with the Layer A face now housing the gear sets, etc. that are currently shown on the Layer A back, etc. and thus eliminating a layer by reconfiguring the components to use the case, and in some embodiments, the case of the host device itself.

Each stepper motor 300*r* communicates with a same logic board 300*s* positioned on a Layer C back 300*xb* via power and communication signals transmitted via a male ribbon clip 300*v* positioned in a clip insertion area 300*w* connecting a pair of female to male flex ribbon connections 300*u*, one positioned on the Layer C back 300*xb* to another positioned on a Layer C front 300*xf*. The motorized security door 300 has multiple clip insertion areas 300*w* and inside each clip insertion area is a single male ribbon clip 300*v* transferring signals and power from one side of the respective layer to another side of a same layer, in this case from the Layer C back 300*xb* to the Layer C front 300*xf*, as well as from back to front of Layer B, allowing power and communication signals to move between front and back of layers in the three layer stack.

Power and communication signals also move between different layers in the three layer stack. Looking at FIGS. 3*i-h*, the flex ribbon for power and communications 300*b* on the Layer B back 300*pb* is shown with a first end terminating in a series of male connecting pins 300*d*, and with a second end terminating in the female to male flex ribbon connections 300*u* described in the preceding paragraph. The male connection pins 300*d* of the Layer B back 300*pb* mate with a series of female connection pins 300*e*, most clearly understood by looking at FIG. 3*b*, which shows the three layer stack in partial exploded view. The host camera fits into a space behind the male connection pins 300*d* and female connection pins 300*e* shown centrally in the view in FIG. 3*b*, in a space between the Layer C front 300*xf* and the Layer B back 300*pb*.

Figure 3I:
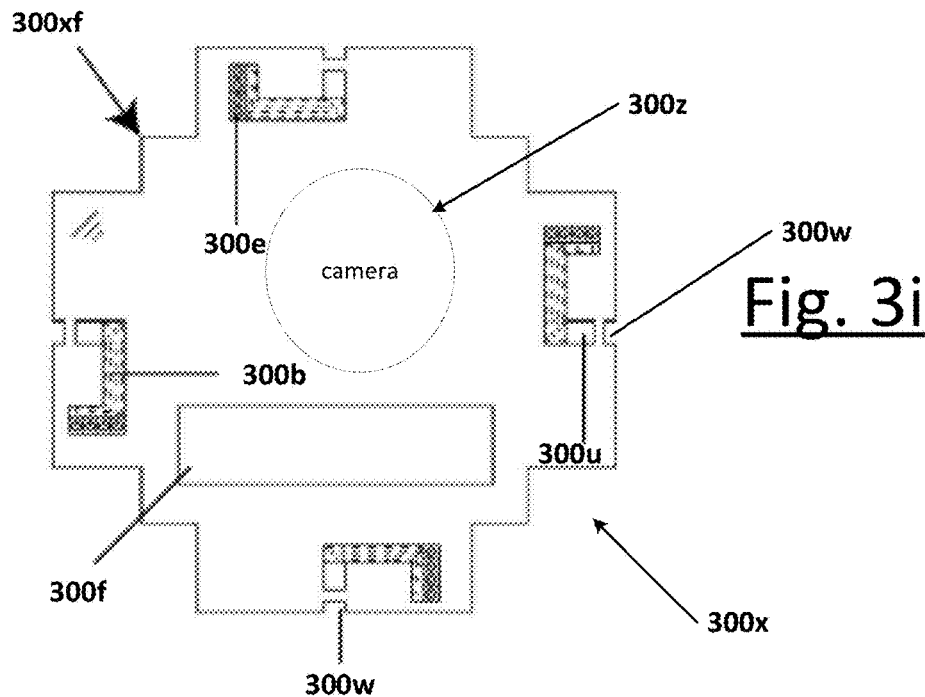
FIG. 3i is a front view of Layer C in FIG. 3b, showing various flex ribbon and pin connections.
Figure 3J:
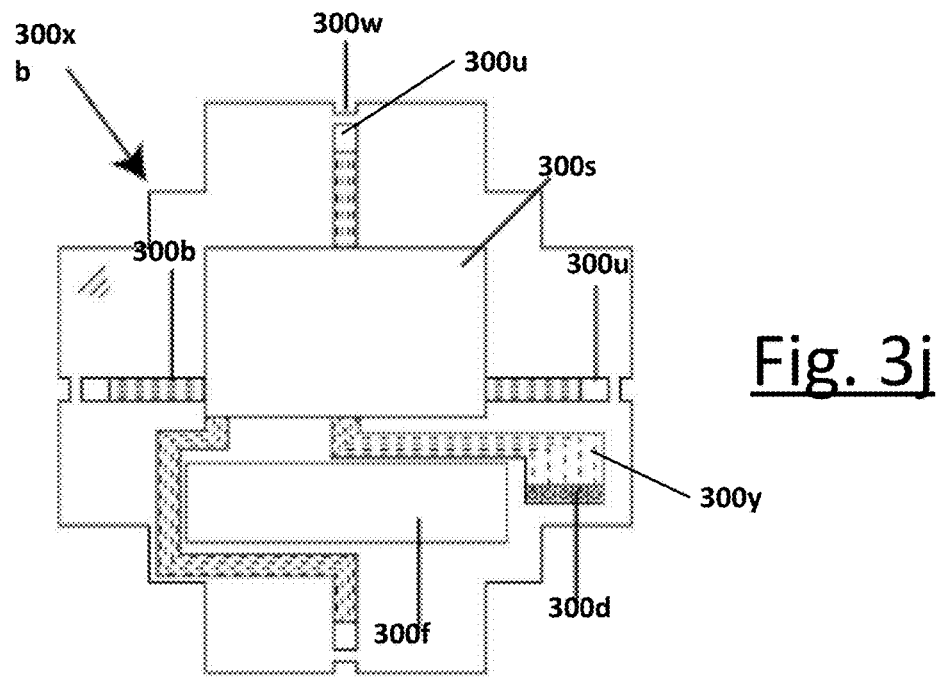
FIG. 3j is a back view of Layer C in FIGS. 3b and 3i, further showing a logic board.

Still looking at FIG. 3*i*, the host device camera (not shown) is attached to the Layer C front 300*xf* in a space 300*z* that is a convenient area where no other component is affixed, as generally shown in the drawing. The inventor notes that the host camera shape and size varies between different host devices, and in some embodiments can also include multiple cameras of varying design, and hence placement of any host camera or cameras of the host device may vary from the position disclosed in the Figures on the Layer C front 300*xf*, based on host camera characteristics and needs.

Given the real security issues surrounding the prior art of the host camera's vulnerability to unauthorized control, the inventor stresses that the host camera in the motorized security door 300 is separately controlled by the host device and not by the logic board of the motorized security door 300, and as such, the host camera communicates with and is powered by a camera flex ribbon 300*c*, affixed to the host camera and inserted through a slot or hole 300*f* formed into the Layer C. Still looking at the Layer C, in FIG. 3*j*, the logic board 300*s* is shown generally centrally affixed to the Layer C back 300*xb*, and with four flex ribbons for power and communications 300*b* communicating with the logic board 300*s* and up to the stepper motors. A main power and communication ribbon 300*y* affixed to the Layer C back 300*xb* and to the logic board 300*s* plugs into a host ribbon (not shown) that itself communicates with the host logic board and host device, directly or indirectly, enabling power and communication signals from the host device and controlled via software installed on the host device, to control and operate the motorized security door 300. At all times, the host logic board controls host camera function separately and independently of the motorized security door 300 function.

Figure 3L:
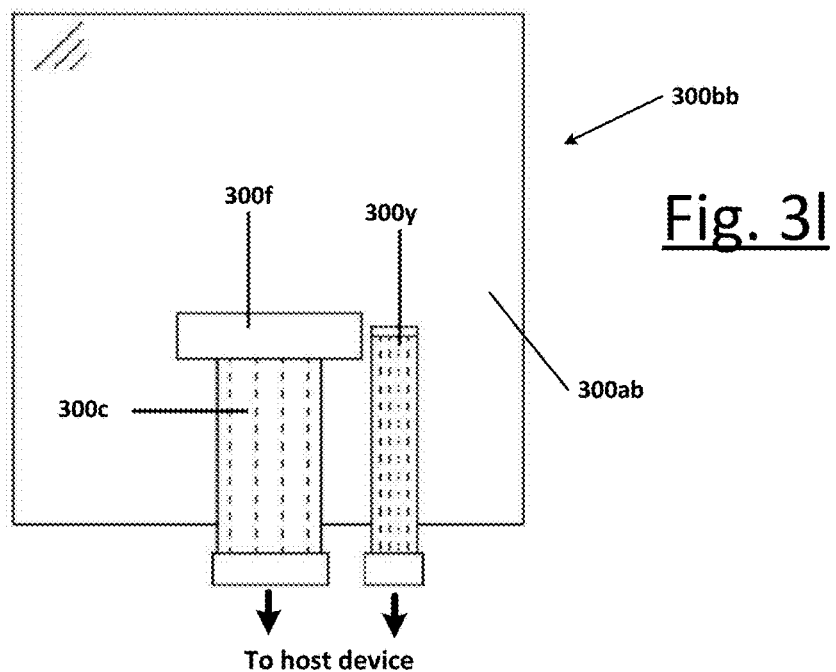
FIG. 3l is an outermost or back view of the back case of the invention, immediately adjacent a host camera.
Figure 3K:
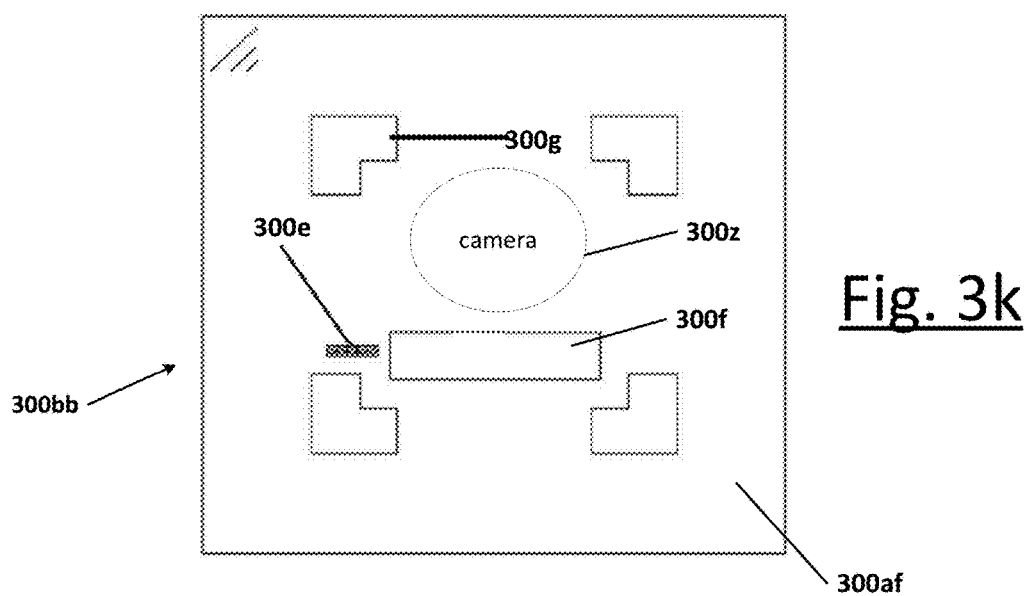
FIG. 3k is an innermost or front view of a back case of the invention immediately adjacent the back view of Layer C.
Figure 3M:
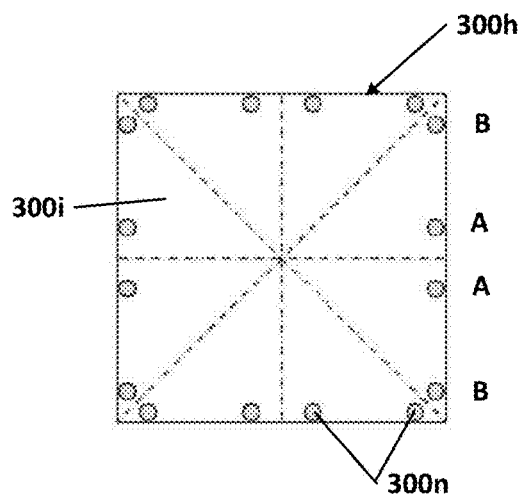
FIG. 3m is a front view of an assembled plurality of shutter fins.
Figure 3N:
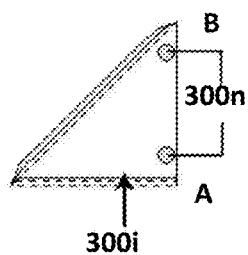
FIG. 3n is a front view of a single shutter fin.
Figure 3O:
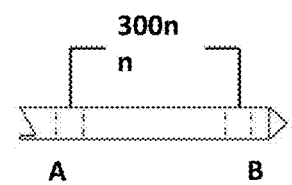
Figure 3H:
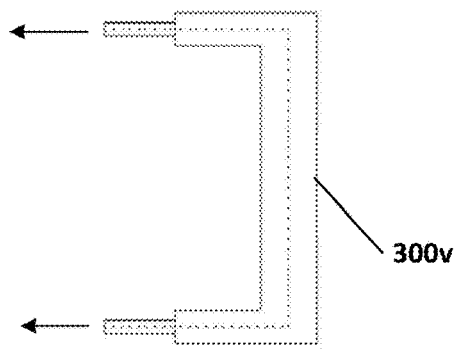
FIG. 3h is a detail view of various flex ribbon and pin connections in FIG. 3g.

Finally, turning now to FIGS. 3*l-k*, an innermost side of the back of the case 300*a* is shown with the slot or hole 300*f* through which the camera flex ribbon 300*c* exits to attach to the logic board of the host device (directly or indirectly) to power and operate the camera. Female connection pins 300*e* affixed to the innermost side of the back of the case mate with male connection pins 300*d* of the main power and communication ribbon 300*y*, and on an outermost back side of the case 300*a* that again feed into the host logic board and power supply, directly or indirectly, to power and communicate with the logic board 300*s* of the motorized security door 300, which then directs the stepper motors to open or close the assembled shutter fins 300*h* according to instructions sent by software installed in the host device.

All layers in the stack are held in place by one or more layer alignment blocks 300*g* that maintain a position of the layers 300*o* 300*p* 300*x* vertically as well as horizontally in the three layer stack as well as securing the three layer stack to the case 300*a* of the motorized security door 300. The layer alignment blocks are best viewed in FIG. 3*b* and FIG. 3*k*.

The inventor notes that he has shown four blocks, however depending on the interior configuration requirements a single alignment block can hold the stack together and prevent slippage or movement of the layers vis a vis one another.

Numerous other modifications and alternative arrangements may be devised by those skilled in the art without departing from the scope of the present invention. For instance, as previously mentioned, while the Figures show a single shutter per camera lens aperture in the first and second embodiments, it is also possible to configure a bipartite or multiple shutters that telescopically open and close over the camera lens. A configuration of the shutter shown in the Figures is one in which the shutter moves sideways or up and down across the camera lens aperture, and whether the shutter is a single piece or two or more pieces that slide over or away from the aperture are other embodiments of the inventor's motorized security door 100 200 300 and numerous possible configurations using the stepper motors, threaded screw or screws and threaded nut or nuts shown herein can be used in conjunction with the shutter to cover and uncover the camera lens, hence the Figures are not meant to limit the invention to just the representative embodiments shown. While the third embodiment of the motorized security door 300 shows a plurality of shutter fins to make a shutter fin assembly 300*f*, the inventor notes that the track and gear configurations can also work for a shutter fin assembly with far more or fewer fins, and could even work with a single shutter fin if desired. The inventor understands that different host devices will require some modification of the three layer stack previously described. For instance, depending on the size of the host device, the components described in the Figures could all be affixed to a single layer, eliminating the need for the alignment blocks and the other layers. In some cases, for instance when the host device has no space constraints, such as in the case of a stationary host like a security camera built into a wall, the components for the motorized security door could easily be divided between the upper and lower faces of the Layer A, or in fact all components could be positioned and interconnected on the upper face of Layer A. For other host devices, a two layer stack might make more sense and be capable of housing all the necessary components. Still in others, again depending on the physical constraints of the host device, four or more layers will be practical. Hence, the inventor stresses that the three layer stack as described in the Figures is just one example of how the motorized security door can be configured, and many rearrangements of components are possible among layers.

The inventor also notes that while the components described herein are all electrically connected via flex ribbons and/or clips, which are standard electrical connections used in computers, smartphones, etc. some of the electrical connections can be simplified and perhaps even eliminated using different configurations of the components, and hence the inventor acknowledges that components may also be in communication with one another but not necessarily electrically wired together. At this moment, wireless technology allows communication between many different things, and the inventor believes certain components in the invention disclosed herein could communicate with one another without physical connections aiding the communicating or transmission of data, with the addition of wireless transmitters and receivers to the respective components.

There are many useful applications of the inventor's motorized security door 100 200 300, and the term "host device" is not meant to limit the invention to smartphones or other hand held electronic visual communication devices. Anything with a camera that can operate wired or wirelessly are also included in the term "host device". For instance, the inventor notes that most new vehicles now with a vehicle backup camera, whether installed as OEM parts or as third party provided equipment. The third embodiment of the motorized security door 300 is especially useful here to both prevent unwanted snooping as well as to simply protect the camera lens from debris or damage. For instance, in the prior art, backup cameras have no protective door whatsoever and typically automatically turn on when the vehicle is operated in reverse, and while convenient, there are many circumstances in which a driver may not want the camera lens exposed. For instance, when backing up in a dusty environment, or when the conditions are such that there is flying mud or other debris that may damage or be deposited on the lens, the driver may prefer to keep the lens covered and use side mirrors to back up. In such cases, however, perhaps the driver would like to "peek" occasionally at what the camera may show without a full commitment to either having the lens exposed or closed at all times. The ability to control the shutter independently of camera function is highly desirable, and currently unavailable in the prior art.

What is claimed is:

1. A motorized security door for a visual communication device, the visual communication device further comprising a host camera having a lens, a power supply, a host logic board in communication with both the host camera and host power supply, and host software installed in the visual communication device controlling the host logic board, the motorized security door comprising:
    at least one shutter having a door wing;
    a threaded screw having a motor end and a free end, and
        a length at least as long as a length of the shutter;
    a threaded nut formed into the door wing and threadably
        coupled to the threaded screw;
    a motor coupled to the motor end of the threaded screw;

a logic board in communication with the motor and the host logic board; and a power supply providing power to the motor and to the logic board;

wherein the motor rotates the threaded screw in a clockwise and counterclockwise direction;

wherein the host software directs the host logic board to communicate rotational and directional instructions to the logic board that then transmits the rotational and directional instructions and power to the motor;

wherein the shutter operation is independent of the host camera operation; and wherein the host camera solely receives operation instructions from the host logic board;

whereby the lens is covered or uncovered by the at least one shutter travelling along the length of the threaded screw as the motor rotates the threaded screw in the rotational and directional instructed by the software and transmitted to the motor via the host logic board and the logic board.

2. The motorized security door in claim 1, wherein the motor is a stepper motor.

3. The motorized security door in claim 1, wherein the motor receives power and directional and rotational instructions from the logic board by at least one flex ribbon affixed to both the motor and to the logic board, and wherein the logic board receives both power and directional instructions from the power supply and host logic board by at least one flex ribbon affixed to both the logic board and the power supply and the host logic board.

4. The motorized security door in claim 1, further comprising a male USB connection, and the visual communication device further comprising a female USB connection in communication with the host power supply;

wherein the power supply for the motor and the logic board is the host power supply and power is transmitted through the male USB connection mating with the female USB connection.

5. The motorized security door in claim 1, wherein the power supply is a battery.

6. The motorized security door in claim 1, further comprising a case sized and shaped to removably receive at least part of the housing of the visual communication device.

7. The motorized security door in claim 6, wherein the housing is further comprised of a top edge, and wherein the case further comprises a threaded nut and a tightening screw threadably engaging the threaded nut, whereby turning the tightening screw in a first direction causes the tightening screw to clamp the case onto a back side of the housing of the visual communication device, and turning the tightening screw in a second direction unclamps the case from the housing of the visual communication device.

8. The motorized security door in claim 7, further comprising a female USB connection formed into the case and in communication with the logic board and the motor, whereby a USB connection cable affixed to both the female USB connection and to a USB connection of the visual communication allows power and directional and rotational instructions from the host logic board and host power supply to be transmitted from the visual communication device to the motorized security door.

9. The motorized security door in claim 1, wherein the visual communication device is a smartphone.

10. The motorized security door in claim 1, further comprising at least one wireless transmitter electrically connected to the host logic board and at least one wireless receiver electrically connected to the logic board, wherein the host logic board wirelessly transmits rotational and directional information to the logic board.

11. A motorized security door for a visual communication device, the visual communication device further comprising a host camera having a lens, a power supply, a host logic board electrically connected to both the host camera and host power supply, and host software installed in the visual communication device controlling the host logic board, the motorized security door comprising:

at least one shutter having a door wing;

a threaded screw having a motor end and a free end, and a length at least as long as a length of the shutter;

a threaded nut formed into the door wing and threadably coupled to the threaded screw;

a motor coupled to the motor end of the threaded screw;

a logic board in electrically connected to the motor and the host logic board; and a power supply electrically connected and providing power to the motor and to the logic board;

wherein the motor rotates the threaded screw in a clockwise and counterclockwise direction;

wherein the host software directs the host logic board to transmit rotational and directional instructions to the logic board that then transmits the rotational and directional instructions and power to the motor;

wherein the shutter operation is independent of the host camera operation; and wherein the host camera solely receives operation instructions from the host logic board;

whereby the lens is covered or uncovered by the at least one shutter travelling along the length of the threaded screw as the motor rotates the threaded screw in the rotational and directional instructed by the software and transmitted to the motor via the host logic board and the logic board.

12. A motorized security door for a visual communication device, the visual communication device comprising a host camera having a lens, a host power supply, a host logic board in communication with both the host camera and host power supply, and software installed in the visual communication device controlling the host logic board, the motorized security door comprising:

at least one first layer having a first layer front side and a first layer back side;

wherein the first layer front side and the first layer back side are in electrical communication with one another;

a shutter fin assembly having at least one shutter fin, the shutter fin assembly affixed to the first layer front side;

a pair of parallel tracks in spaced-apart relationship, each track affixed to the first layer back side and to the at least one shutter fin, and wherein each track is further formed with a series of teeth on opposed sides of the track;

an inner gear set positioned between the pair of tracks, wherein each gear engages another gear in the set, and further engages the series of teeth along an immediately adjacent side of each track in the pair of tracks;

a pair of track receiving slots in spaced-apart relationship sized, shaped, and positioned to receive the pair of tracks and positioned on at least one of the first layer and the second layer;

a motor affixed to at least one of the first layer back side and the second layer front side, and positioned between the pair of tracks;

a drive gear positioned so as to engage one gear of the inner gear set and rotatably coupled to the motor;

wherein the motor rotates the drive gear in a clockwise and counterclockwise direction; and a logic board positioned on the third layer in communication with the motor;

wherein the host camera is positioned on the third layer immediately below the shutter fin assembly and oriented such that the lens is immediately below and adjacent the shutter fin assembly;

wherein the host camera operation is independent of the opening and closing of the shutter fin assembly, and only the host logic board transmits instructions to the host camera;

wherein the logic board is in communication with the host logic board and host power supply; and wherein software installed in the visual communication device transmits power and rotational instructions via the host logic board to the logic board that then transmits power and rotational instructions to the motor, actuating the motor and causing the pair of tracks to enter or exit the pair of track receiving slots depending on the rotational instructions received, whereby the shutter fin assembly attached to the tracks covers or uncovers the lens of the host camera.

13. The motorized security door in claim 12, wherein the shutter fin assembly is comprised of two shutter fins and further comprising:

a second pair of tracks and receiving slots;

wherein one track of the second pair of tracks is positioned in spaced-apart relationship with one track of the first pair of tracks;

an outer gear set positioned between one track of the first pair of tracks and one track of the second pair of tracks; and wherein each gear from the outer gear set engages the other gear in the pair, and further engages the series of teeth along an immediately adjacent side of a track of the first pair and a track of the second pair.

14. The motorized security door in claim 12, wherein power and rotational instructions from the host power supply and host logic board are transmitted to the logic board and the motor by two or more flex ribbon connections.

15. The motorized security door in claim 12, wherein the motor is a stepper motor.

16. The motorized security door in claim 12, further comprising a second layer having a front side and a back side, the front side in electrical communication with the back side.

17. The motorized security door in claim 16 wherein the track is a bipartite track having an upper track and a lower track, the upper and lower tracks sized and shaped to physically couple so as to form a single track, and wherein the lower track is affixed to the second layer front side, whereby coupling the upper and lower tracks couples the front side of the second layer to the back side of the at least one first layer.

18. The motorized security door in claim 12, further comprising a case housing the three layer stack and the host camera.

19. The motorized security door in claim 12, wherein the visual communication device is a smartphone.

20. The motorized security door in claim 12, wherein the visual communication device is a vehicle back up camera.

* * * * *